D. L. MacAULAY.
CLOTHESLINE REEL.
APPLICATION FILED DEC. 14, 1920.
1,406,882.
Patented Feb. 14, 1922.
2 SHEETS—SHEET 1.
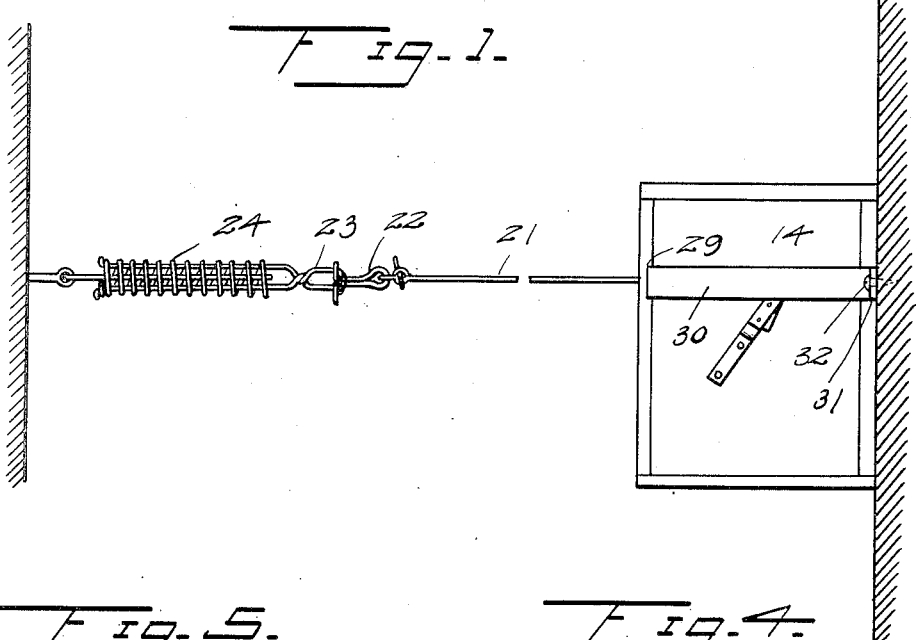
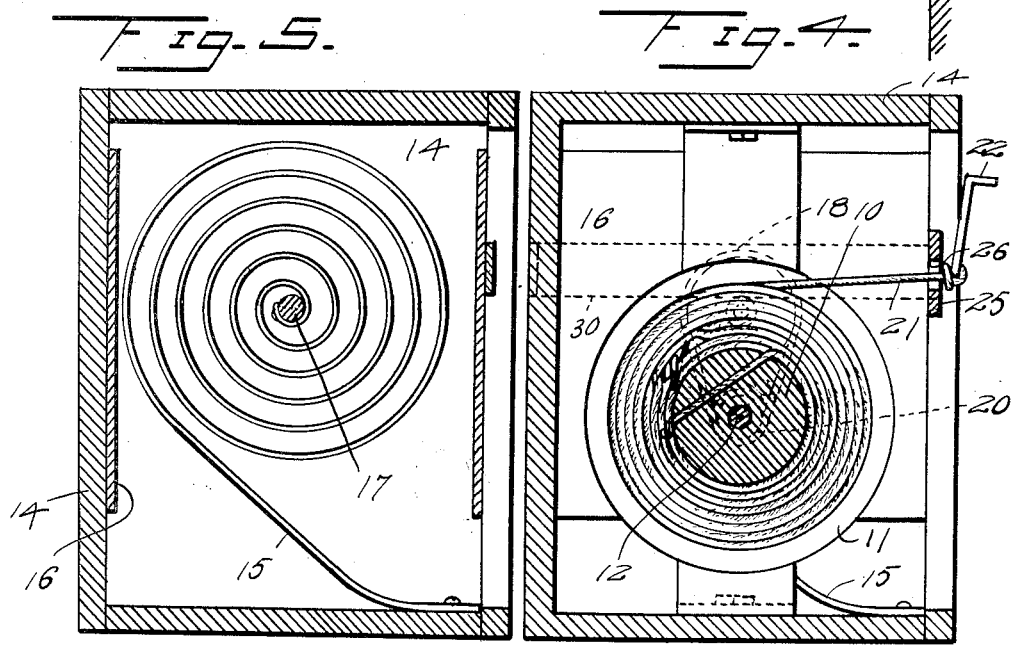
Inventor
D. L. MacAulay.

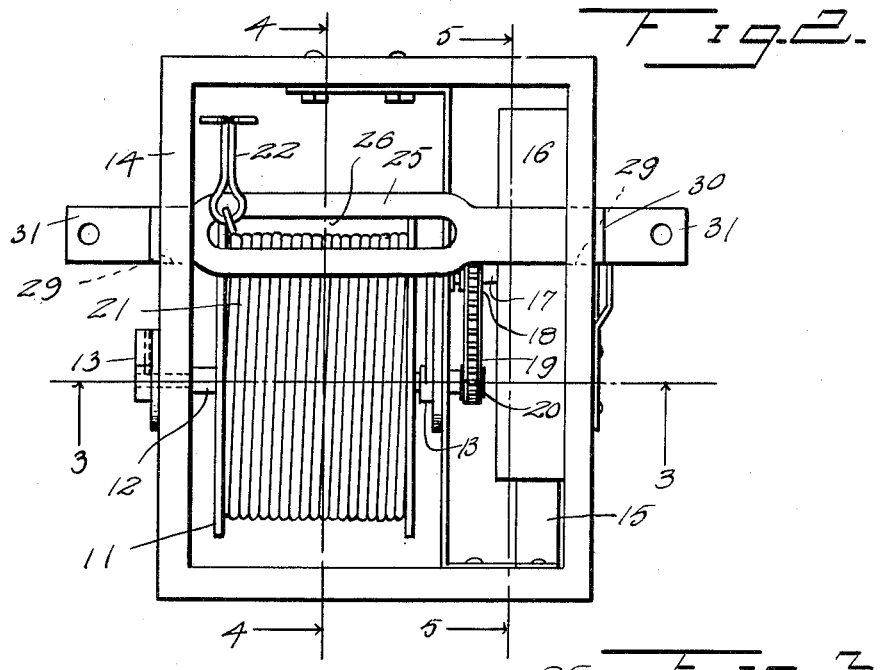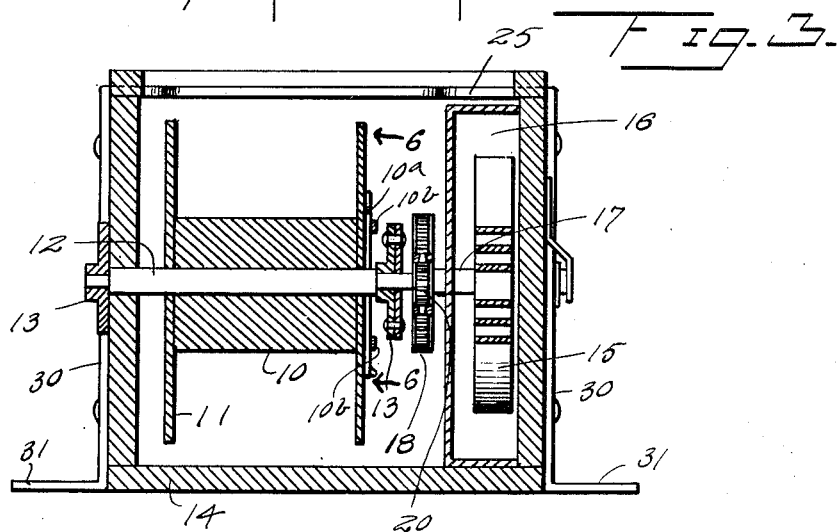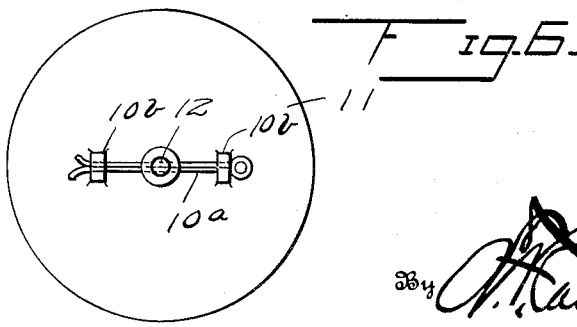

UNITED STATES PATENT OFFICE.

DANIEL L. MacAULAY, OF INVERNESS, NOVA SCOTIA, CANADA.

CLOTHESLINE REEL.

1,406,882. Specification of Letters Patent. Patented Feb. 14, 1922.

Application filed December 14, 1920. Serial No. 430,797.

*To all whom it may concern:*

Be it known that I, DANIEL L. MACAULAY, a subject of the Dominion of Canada, residing at Inverness, in the Province of Nova Scotia and Dominion of Canada, have invented certain new and useful Improvements in Clothesline Reels; and I do hereby declare the following to be a full, clear, and exact description of the invention, such as will enable others skilled in the art to which it appertains to make and use the same.

An object of the invention is to provide a simple, inexpensive and efficient device to serve as a clothes line reel whereby a clothes line of hemp or like material may be maintained in a reeled and housed condition except when actually in use to protect it from the weather and thus prevent its deterioration by decay, and also to provide, in a device for the purpose indicated, means whereby it may be readily secured to a post or building under such conditions as to effectually resist the strains to which it is subjected when the line is extended and occupied and whereby the line is accurately guided to the drum upon which it is reeled, so that particular attention on the part of the operator in housing the line may not be necessary, and so that when the line is no longer needed the free end thereof may be detached and released for automatic winding by means provided for that purpose; and with these objects in view the invention consists in a construction and combination of parts of which a preferred embodiment is shown in the drawings, wherein:

Figure 1 is a view of an apparatus embodying the invention showing the line in an extended position.

Figure 2 is a front view of the housing in which the reel is mounted.

Figure 3 is a horizontal sectional view on the plane indicated by the line 3—3 of Figure 2.

Figure 4 is a vertical section on the plane indicated by the line 4—4 of Figure 2.

Figure 5 is a vertical section on the plane indicated by the line 5—5 of Figure 2, and Figure 6 is a detail view in end elevation of the drum.

The drum 10 which is flanged as at 11 is secured to a shaft 12 by a cotter pin 10$^a$ passing through the shaft and through lugs 10$^b$ carried by one of the flanges 11 as shown in Fig. 6. The shaft 12 is mounted in suitable bearings 13 in the housing or casing 14 and an actuating spring 15 arranged in a special or supplemental housing 15 within the housing or casing 14 is provided with an arbor 17 carrying a sprocket wheel 18 which is connected by a chain 19 with a similar but smaller sprocket 20 on the shaft of the drum. The free end of the line 21 may be provided with a shackle 22 for engagement with the stem 23 of a compensating spring 24 adapted to be secured to a post or other object between which and the casing or housing the line is to be stretched, and disposed transversely at the front of the casing or housing is a bar 25 provided with a slot 26 through which the line extends and by which it is guided in the operation of reeling and unreeling, it being obvious that when unreeled the turning of the drum places the drum actuating spring under a tension dependent upon the amount of extension of the line, so that when the end of the line is released the drum will be turned to rewind the line and thus house it within the casing, the terminal shackle carried by the line serving as a stop to limit the reeling movement by engagement with said transverse guide bar.

Said guide bar is preferably extended through openings 29 in the side walls of the casing and is extended to form arms 30 which are outwardly deflected adjacent to the rear wall of the casing to provide feet 31 which are adapted to be fastened by means of screws 32 or any equivalent thereof to the side wall of a building or a post suitable for supporting the casing in position to receive and protect the line.

Said transverse guide bar therefore with its extensions forming the arms and securing feet constitutes a keeper which serves to substantially embrace the casing or housing and thus firmly anchor it to the support to which it may be fastened, and enable it to successfully withstand the strains which may be applied to the line when in use.

Having thus described the invention, what I claim is:—

A reel structure including a casing, a reel within the casing, a bar spanning the casing and having a guide slot for a line secured on the reel, said bar having arms embracing the exterior of opposite sides of the casing, and attaching feet extending outwardly from said arms with their attaching surfaces in substantially the same plane as the base of the casing.

In testimony whereof I affix my signature in presence of two witnesses.

DANIEL L. MacAULAY.

Witnesses:
E. PHILPOTT,
J. D. McDONALD.